H. HERSH.
Revolving Horse Rake.
No. 24,389. Patented June 14, 1859.
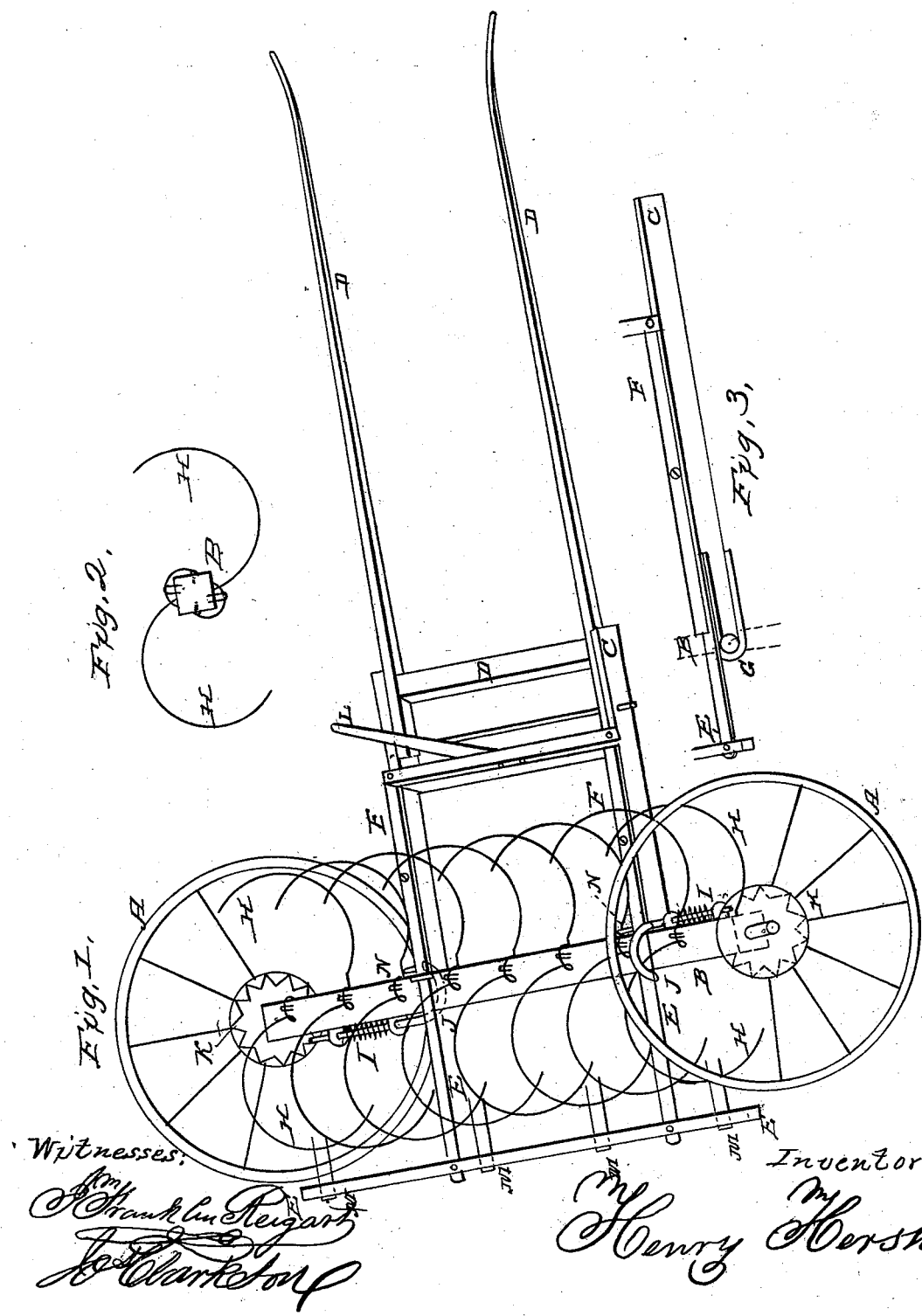

UNITED STATES PATENT OFFICE.

HENRY HERSH, OF LANCASTER, PENNSYLVANIA.

IMPROVEMENT IN HORSE-RAKES.

Specification forming part of Letters Patent No. 24,389, dated June 14, 1859.

*To all whom it may concern:*

Be it known that I, HENRY HERSH, of Lancaster city, county of Lancaster, and State of Pennsylvania, have invented an Improvement in Horse Rakes; and I do hereby declare that the following is a full and exact description thereof, reference being had to the accompanying drawings, and to the letters of reference marked thereon, making a part of this specification.

To enable others skilled in the art to make and use my invention, I will proceed to describe its construction and operation.

Figure 1 represents a view of the revolving rake. Fig. 2 shows how the teeth are arranged and fastened to the carriage-axle by screws and staples, so as to give the teeth the shape of a letter S. Fig. 3 represents that part of the frame showing the eye in which the carriage-axle operates and revolves.

A represents the carriage-wheels; B, the carriage-axle; C, the frame, which is attached to the axle to support the shafts D, cleaner-frame E, and levers F, having an eye, G, formed by a clip surrounding the end of the frame C, in the eye of which the carriage-axle B revolves.

H are the teeth, which are of steel, one end on the one side of axle bent downward and the opposite end bent upward, or reverse, so as to form a figure S. The teeth are fastened to the axle by ordinary screws and staples, and revolve with the axle.

I are spiral-spring locks, fastened with staples or screw-bolts to the carriage-axle, one at each end on opposite sides of the axle, the one end of lock I being curved and extending half-way round the axle, as at J, so as to receive the pressure from the lever F against it. The opposite end and point of lock I presses in and against the hollows or cup-holes of a circular plate, K, on the inside of the hub of the carriage-wheel A, when the wheel is to be locked, so that the axle may revolve with the wheel.

L is an upright main lever, which, by being moved to the right or left, operates one of the side levers F and presses it against the curved part J of the lock I, so as to lock either wheel and revolve the axle and rake with the wheel; and as the end J passes down from off the lever F the lever F is pressed against the upright stay N, which stops the revolution of the axle B, and the rake then commences to work and gather.

M are wire prongs, as cleaners, inserted in the cross-frame E so that each second or third tooth H operates between the prongs to clean the rake as the teeth rise and revolve.

What I claim as my invention, and desire to secure by Letters Patent, is—

The arrangement and combination of the S-shaped teeth H, lock I, revolving axle B, and clearers M, as described, and for the purposes set forth.

HENRY HERSH.

Witnesses:
J. FRANKLIN REIGART,
M. CARPENTER.